A. B. KING.
Wheels for Vehicles.
No. 158,283.  Patented Dec. 29, 1874.
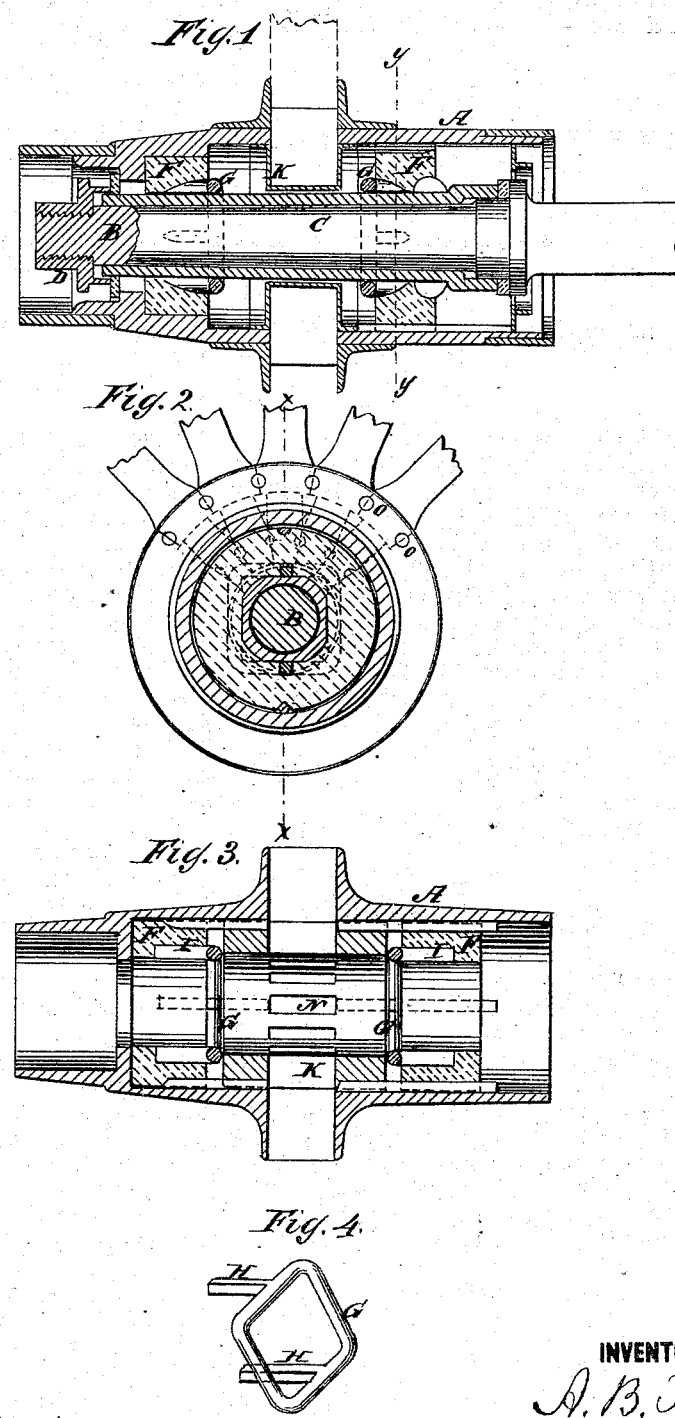
WITNESSES:
E. Wolff
Alex F. Roberts
INVENTOR:
A. B. King
BY
Munn &Co
ATTORNEYS.

UNITED STATES PATENT OFFICE.

ABRAHAM B. KING, OF CAMDEN, OHIO, ASSIGNOR TO CATHERINE KING, OF ROME, GEORGIA.

IMPROVEMENT IN WHEELS FOR VEHICLES.

Specification forming part of Letters Patent No. 158,283, dated December 29, 1874; application filed August 10, 1874.

*To all whom it may concern:*

Be it known that I, ABRAHAM B. KING, of Camden, Preble county, Ohio, have invented a new and Improved Wheel Hub or Center, of which the following is a specification:

The invention will first be fully described, and then pointed out in the claims.

In the drawing, Figure 1 is a longitudinal section of the hub, taken on the line $x\,x$, Fig. 2. Fig. 2 is a cross-section of Fig. 1 on the line $y\,y$. Fig. 3 is a longitudinal section, showing a modification, the spoke-mortises being extended in a wood center; and Fig. 4 is a side view of the metallic frame or stop which keeps the spring in place.

Similar letters of reference indicate corresponding parts.

A is the hub, which may be made of either wood or iron, or partly of wood and partly of iron, the hollow or interior being in three divisions or chambers, for containing the nut and washer on the arm of the axle, the rubber or metallic springs around the pipe-box, and the extension for the spoke-tenons. B is the axle-arm. C is the pipe-box or center. D is the nut on the end of the arm B. F represents rubber springs around the pipe-box, confined and prevented from turning by the square metallic frame or stops G. These arms have stops H H, which enter grooves in the springs, as seen at I, which hold the springs stationary.

I do not confine myself to rubber exclusively, as metallic springs may be made to answer a similar purpose.

Confined as these springs are around the pipe-box or axle, a degree of elasticity is imparted to the axle and wheel which counteracts the usual jarring and concussion, and renders the motion of the vehicle soft and easy. This action also renders the spokes less liable to become loose, and adds to the durability of the wheel.

K is the spoke-tenon extension.

In the wooden hub, Fig. 1, a metallic section is introduced, the center of which receives the spoke-tenon.

In Fig. 3 a wooden section is introduced. Mortises N are made in this section, and the stops G are in contact with its ends, as seen in the figure.

O are holes in the flange of the hub, which allow the spokes to be pinned to the hub or center.

Having thus described my invention, I claim as new and desire to secure by Letters Patent—

1. The combination, with hub A and pipe-box C, of the intermediate springs F F, as and for the purpose described.

2. The combination, with a spring, F, between hub and pipe-box, of the frame G, having stops H, that fit in recesses of spring, as and for the purpose specified.

ABRAHAM B. KING.

Witnesses:
J. R. McCORD,
C. M. ROHRER.